United States Patent [19]

Bando

[11] Patent Number: 4,843,764
[45] Date of Patent: Jul. 4, 1989

[54] GLASS PLATE GRINDING APPARATUS

[75] Inventor: Shigeru Bando, Tokushima, Japan

[73] Assignee: Bando Kiko Co., Ltd., Tokushima, Japan

[21] Appl. No.: 273,696

[22] Filed: Nov. 21, 1988

Related U.S. Application Data

[63] Continuation of Ser. No. 207,001, Jun. 8, 1988, abandoned, which is a continuation of Ser. No. 28,032, Mar. 18, 1987, abandoned, which is a continuation of Ser. No. 752,080, Jul. 3, 1985, abandoned.

[30] Foreign Application Priority Data

Jul. 7, 1984 [JP] Japan .................. 59-102585[U]

[51] Int. Cl.⁴ ............................ B24B 9/10; B24B 1/00
[52] U.S. Cl. .................................... 51/110; 51/215 E; 51/283 E; 51/240 GB
[58] Field of Search ................. 51/110, 112, 38, 74 R, 51/215 E, 76 R, 137, 138, 140, 283 E, 240 GB; 198/604, 626–627

[56] References Cited

U.S. PATENT DOCUMENTS

| | | | |
|---|---|---|---|
| 2,117,641 | 5/1938 | Westlund | 198/626 |
| 2,754,956 | 7/1956 | Sommer | 51/110 X |
| 3,136,094 | 6/1964 | Reasor . | |
| 3,841,027 | 10/1974 | Bando | 51/110 |
| 4,079,551 | 3/1978 | Bando . | |

FOREIGN PATENT DOCUMENTS

| | | |
|---|---|---|
| 2421156 | 6/1975 | Fed. Rep. of Germany . |
| 2702798 | 2/1978 | Fed. Rep. of Germany . |
| 3315224 | 12/1983 | Fed. Rep. of Germany . |
| 2148412 | 3/1973 | France . |
| 2257390 | 8/1975 | France . |
| 127693 | 10/1977 | Japan . |
| 57-91733 | 6/1982 | Japan . |

Primary Examiner—Debra Meislin
Attorney, Agent, or Firm—Michael N. Meller

[57] ABSTRACT

A glass plate grinding apparatus comprises holding members attached to a chain moved by a rotationally driven sprocket, a belt conveyor for conveying a glass plate while seizing the plate in co-operation with holding members, and a grinder for grinding the edge of the glass plate being conveyed.

1 Claim, 3 Drawing Sheets

GLASS PLATE GRINDING APPARATUS

This application is a continuation of application Ser. No. 207,001 filed 6/8/88, now abandoned, which is a continuation of application Ser. No. 28032 filed 3/18/87, now abandoned, which is a continuation of application Ser. No. 752,080, filed 7/3/85, now abandoned.

This invention concerns a glass plate grinding apparatus such as a beveling machine for chamfering straight edges of glass plates and an edging machine for grinding straight cut ends of glass plates.

Conventional glass plate grinding apparatus have a structure requiring vertically placing a glass plate as a workpiece while downwardly facing an edge to be ground, and successively grinding the lower edge of the glass plate linearly by grinding wheels disposed successively along and below the edge of the glass plate to be ground while holding the glass plate at both sides thereof between a pair of conveyors.

The paired conveyors comprise a combination of a support conveyor for conveying the glass plate while holding a predetermined position of the face of the plate to be ground relative to the grinding wheels and a press vconveyor for urging the glass plate toward the support conveyor. Usually, the press conveyor has a width narrower than that of the support conveyor and is situated on the side of the glass plate being conveyed where the grinding wheels are disposed. The lower end of the press conveyor is disposed above the lower edge of the glass plate so that the plane of the glass plate is resiliently supported toward the support conveyor.

On the other hand, the support conveyor is usually situated on the side of the glass plate opposite to the grinding wheels. The lower end of the support conveyor is situated below the lower end of the press conveyor and above the lower edge of the glass plate.

The glass plate is seized between the press conveyor and the support conveyor. At a stepped portion between the lower end of the press conveyor and the lower end of the support conveyor, the glass plate is disposed such that it is supported on one side thereof by the support conveyor and exposed on the other side thereof, that is, on the side of the press conveyor. The exposed portion of the glass plate is chamfered by the grinding wheels during relative movement of the glass plate and the grinding wheels.

The structure of the conveyor may generally be classified into two types, that is, a caterpillar conveyor system in which holding members, each composed of a base member and an elongate rectangular member, are attached to a chainand a conventional belt conveyor system. Both the support conveyor and the press conveyor can conform to the conveyor structure of either of the above-mentioned two systems.

In order to perform the inteneded grinding as accurately as possible in the conventional glass plate grinding apparatus having such a structure, it is necessary to grind the glass plate while firmly holding the plate at a correct position and minimizing displacement of the plate out of that position.

Reference is at first made to the conveyor structure of the caterpillar conveyor system. Since the caterpillar conveyor system has a structure whererby a plurality of rectangular holding members are attached to a chain, which is meshed with a sprocket gear and caused to run by the rotational driving of the sprocket, no slips occur at all during driving even in a case where a heavy glass plate being conveyed is seized between the conveyors.

Further, the rectangular holding member has such a structure that the seizing face of the holding member is kept in parallel with the plane of the glass plate as accurately as possible and the seized glass plate is firmly held in the position where the predetermined intended grinding can be made, with no displacement therefrom.

However, as the chain is used for several years, pins, bushes or similar chain components become abraded, and each of the holding members is also abraded at the sliding face which contacts the guide-way for guiding the holding members.

The result is "rattling" of the holding members, which results in clearance of the holding members at the portion where the grinding load is applied on the glass plate when the seized plate is conveyed by the holding members. Also the glass plate is tilted forward or backward with respect to the direction of advancement of the glass conveyed. In this case, the holding members are being fed in a struggling manner upon seizing and conveying the glass plate.

Therefore, in the case of employing the caterpillar conveyor system for the conveyors, frequent maintenance work is indispensable for eliminating the "rattling" in the holding members in order to perform accurate grinding of the glass plate.

With regard to the conveyor structure of the belt conveyor system, the belt used in this system is generally of a broad width and constituted as a unitary body over its entire width. Thus, it is free from "rattling" as occurs in the holding members of the caterpillar conveyor system and causes no "tilting" of the glass plate when the plate is put between the conveyors. That is, since the belt conveyor system has no mechanical pivotal connections as used in the caterpillar conveyor system, the belt does not displace upon application of a grinding load, but instead runs while being urged against a guideway over a wide area.

If the belt has a certain ridigity, since the clearance may be formed only at the curvature of the glass plate, the glass plate can be seized firmly for straight forwarding and conveyed linearly.

However, since the belt is driven by the friction between the belt and a cylindrical drum, slippage therebetween may often result when the glass plate is conveyed with an excessively heavy load on the belt, wherein knocking is caused during circulation of the belt, which sometime renders the circulation impossible.

Thus, when the belt conveyor system is employed for the conveyors, it is difficult to seize the glass plate with a large force and, accordingly, a difficulty is introduced in conveying the glass plate while keeping it at a predetermined position and in performing accurate grinding of the glass plate.

Particularly, since the press conveyor situated on the side of the grinding wheels often has a narrow width belt that provides an insufficient tension, slippage tends to occur readily.

It is, accordingly, an object of this invention to provide a glass plate grinding apparatus capable of eliminating the foregoing drawbacks in the prior apparatus, that is, a glass plate grinding apparatus comprising, in combination, an advantageous feature of the caterpillar conveyor system that causes no slips upon seizing and conveying a glass plate and an advantageous feature of the belt conveyor system that causes no tilting of the seizing face of the conveyor relative to the plane of the glass plate even if the glassplate is firmly seized upon conveyance.

Another object of this invention is to provide a glass plate grinding apparatus in which a press conveyor tending to cause slippage comprises a caterpillar conveyor and a support conveyor supporting the glass plate with large width comprises a belt conveyor, and by which a glass plate can always be conveyed while being held firmly with no slips although said apparatus is used for a long time.

The above-described objects can be attained by a glass plate grinding apparatus comprising means for rotating a sprocket means, a first conveyor means having a chain engaging the sprocket means and circulated by the rotational driving force exerted from said rotating means and holding members disposed in parallel to each other on the outer circumference of the chain, and a second conveyor means having a belt conveyor disposed in opposition to the holding members, seizing the glass plate in co-operation with the holding members and circulating along the circulating direction of the holding member to thereby move the glass plate, and means for grinding the thus seized and moved glass plate.

For better understanding of the object of this invention, this invention will now be described by way of its preferred embodiment referring to the accompanying drawings, with no particular restriction of the invention thereto.

Figure 1:
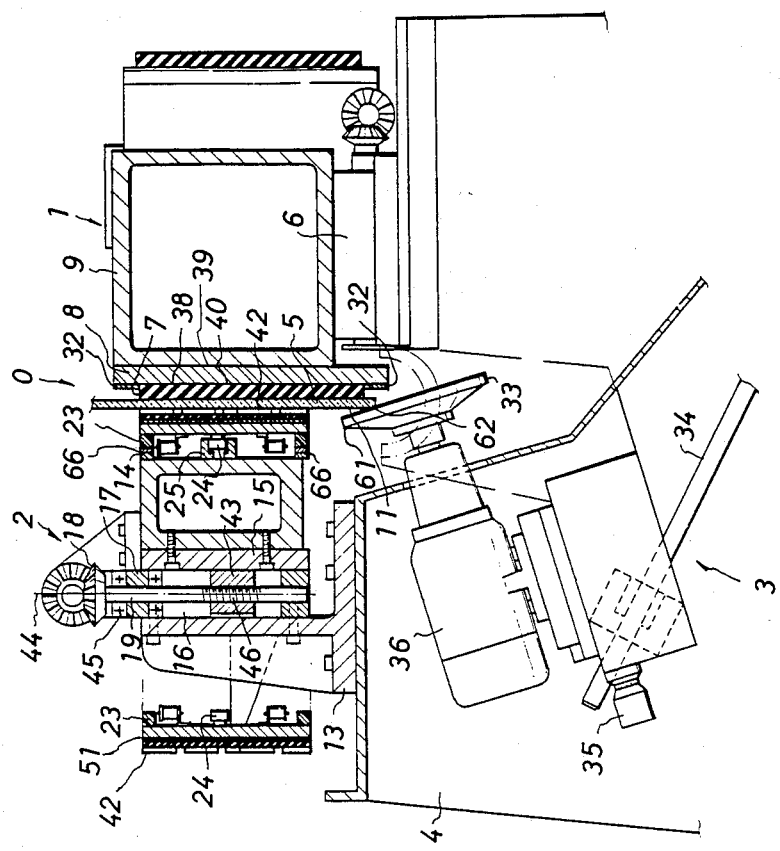
FIG. 1 is a cross-sectional view for a preferred embodiment according to this invention
Figure 2:
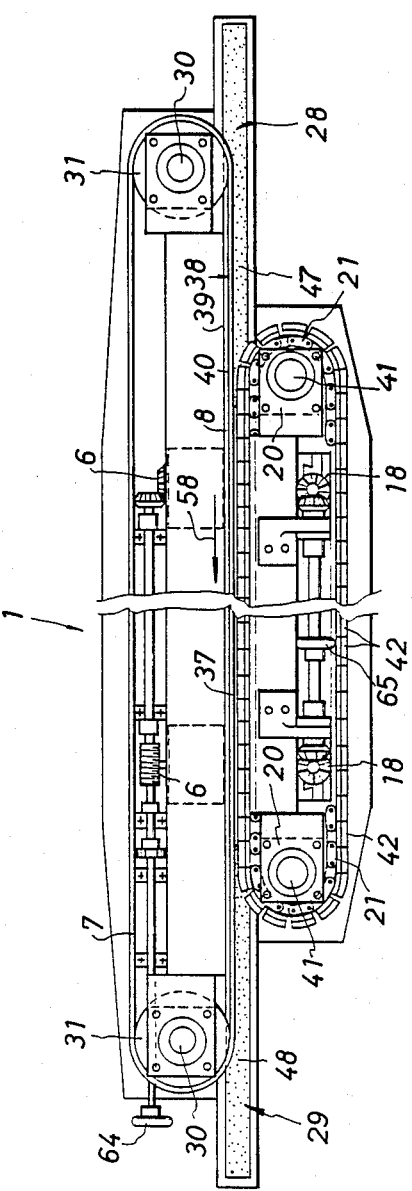
FIG. 2 is a plan view for the embodiment shown in FIG. 1.

As shown in FIG. 1 and FIG. 2, a glass plate grinding device 0 comprises a base 4, a support conveyor device 1, a press conveyor device 2 and a grinding wheel device 3.

The base 4 has a structure on which the support conveyor device 1, the press conveyor device 2 and the grinding wheel device 3 are disposed respectively for grinding a glass plate 5.

The grinding wheel device 3 comprises a grinding wheel 33 for rotationally grinding the glass plate 5, a motor 36 for rotationally driving the grinding wheel 33, a member 35 for adjusting the advancement and withdrawal toward of the motor 36 toward and away from the glass plate 5, thereby adjusting the depth to which the glass plate 5 is ground by the grinding wheel 33, and a member 34 for adjusting the angle of the motor 36 relative to the glass plate 5, that is, the angle of the grinding wheel 33 relative to the glass plate 5.

The support conveyor device 1 comprises two bearing devices 30 (FIG. 2) mounted near the longitudinal ends of the base 4 respectively, drums 31 each having a shaft rotatably supported at the bearing portion in each of the bearing devices 30, an endless belt 7 laid around these drums 31 respectively for circulating along the rotating direction of the drums 31, a belt support plate 8 for maintaining the position of the endless belt 7 from the circulating inner surface 38 of the endless belt 7 relative to the press conveyor device 2, belt guide members 32 attached on the belt support face 40 of the belt support plate 8 for positioning the endless belt 7 in the vertical direction, a support conveyor frame 9 that secures the belt support plate 8 on the side of the support plate mounting face 39 of the belt support plate 8, and a horizontal sliding device 6 disposed below the support conveyor frame 9 and mounted to the substrate 4 for carrying out the horizontal moving adjustment of bringing the support conveyor frame closer to or separating the support conveyor frame 9 from the press conveyor device 2 by a horizontal sliding adjustment knob 64.

The press conveyor device 2 comprises sprockets 20 mounted near the longitudinal ends of the base 4 and each having a rotatably supported shaft 41, a driving device (not shown) for rotationally driving at least one of the sprocket shafts 41 of the sprockets 20, an endless chain 21 laid around the rotationally driven sprockets 20 respectively for circulating movement, a plurality of members 42 mounted over the entire circulating outer circumference of the endless chain 21 for holding the glass plate 5, a roller 24 mounted near the central portion of the holding members 42 for facilitating the movement of the holding members 42 in the circulating direction, sliding members 23 which are attached to the vertical upper and lower plates of the holding members 42 for stabilizing the position of the outer circumferential surface of the holding members 42 relative the endless belt 7 in the circulating movement, a press conveyor frame 14 which is in sliding contact with the sliding members 23 for defining the position of the sliding members 23 to the endless belt 7, a guide groove 25 attached to the press conveyor frame 14 for guiding the roller 24 in the circulating direction while defining the upper and lower positions in the vertical direction, a sliding member 15 integrally mounted on the press conveyor frame 14 and protruding from the side opposite to the mounted surface and integrally having a female thread 43, a slide block 16 engaging the sliding member 15 vertically slidably and having a shaft bearing 45 disposed coaxially with the shaft center 44 for the female thread 43, a shaft 19 situated coaxially with the axial center 44 for the bearing 45 and the female thread 43 and having a male thread 46 engageable with the female thread 43 in which the threading engagement between the male thread 46 and the female thread 43 due to the rotation of the male thread 46 vertically displaces the female thread 43, thereby vertically moving the sliding member 15, a bevel gear device 18 for rotating the shaft 19 by means of a vertical slide adjusting knob 65, and a bracket 13 for securing the slide block 16 to the base 4.

A feed conveyor device 28 is adapted to feed a vertically placed glass plate 5 to be ground and move the plate while carrying and seizing it in a vertical state by an endless belt 47.

A discharge conveyor device 29 is adapted to discharge the glass plate 5 which has been ground while being vertically put between the press conveyor device 2 and the support conveyor device 1. Discharge conveyor device 29 discharges the plate 5 while vertically carrying and seizing it on an endless belt 48.

Figure 3:
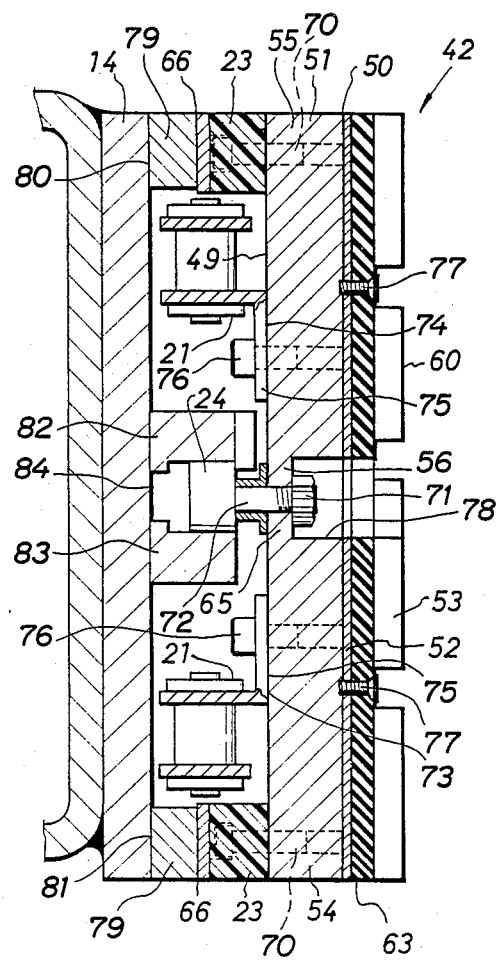
FIG. 3 is an enlarged view of the holding member of the press conveyor shown in FIG. 1.

As shown in FIG. 3, the holding member 42 comprises sliding members 23, rectangular-shaped base member 51, thin plate member 52 and resilient plate member 63. One sliding member 23 is secured to one end 54 of one surface 49 of the base member 51 and another sliding member 23 is secured to another end 55 thereof with bolts 70 respectively. To the central portion of one surface 49 of the base member 51, shaft 72 of roller 24 is secured with nut 71 and roller 24 is rotatably mounted on shaft 72.

The nut 71 is contained in hole 78 cut into another side of the base member 51. On one surface 49 of the base member 51, two endless chains 21 are secured to the portion 73 between one end 54 and the central portion 56 and to the portion 74 between another end 55 and the central portion 56, by the medium of L-shaped member 75, with bolt 76 respectively. On the other hand, to another side 50 of the base member 51, the thin plate member 52 and the resilient plate member 63 lapped over the thin plate member 52 are secured respectively with a plurality of nuts 77. The thin plate member 52 is desirably made of metal such as steel and the resilient plate member 63 is formed with resilient material such as rubber. Protrusion 53 formed on the face 60 makes it possible that the glass plate 5 to be ground is firmly held without being damaged or slipping relative to the resilient plate member 63.

The holding member 42 thus constituted is mounted on the conveyor frame 14 as described below.

To each of the ends 80 and 81 of the conveyor frame 14, rod member 79 is secured along the vertical direction in the drawing and plate member 66 is secured lapped over this rod member 79. Plate member 66 is desirably formed with material such as stainless steel which is smooth and less corrosive. To the central portion 84 of the conveyor frame 14, upper rail member 82 and lower rail member 83 are respectivey secured and the roller 24 can be held between upper rail member 82 and lower rail member 83.

Therefore, the holding member 42 moves by rotation of the roller 24 between the upper rail member 82 and the lower rail member 83 and sliding of the sliding members 23 with respect to the plate member 66, driven by the movement of the endless chain 21 along the horizontal direction.

The above-described glass plate grinding apparatus operates as described below. At first, as shown in FIG. 2, the endless feed belt 47 of the feed conveyor device 28 is driven by an appropriate driving means (not illustrated) along and toward the gap 37 defined between the support conveyor device 1 and the press conveyor device 2. Further, the endless chain 21 of the press conveyor device 2 is driven by way of the sprockets 20 by an appropriate driving means (not illustrated) and the holding members 42 attached to the endless chain 21 move in the direction of the arrow 58. In this state, the glass plate 5 is placed vertically on the endless belt 47 of the feed conveyor device 28 and conveyed by the feed conveyor device 28 so as to deliver it into the gap 37 formed between the holding members 42 of the press conveyor device 2 and the endless belt 7 of the support conveyor device 1. During movement through the gap 37, the glass plate 5 is supported only by the seizing force created by the endless belt 7 of the support conveyor device 1 and the holding members 42 of the press conveyor device 2. The extent of the gap 37 is previously adjusted by the horizontal sliding device 6 of the support conveyor device 1 so as to attain a required seizing force depending on the thickness of the glass plate 5 to be ground. The state of the grinding wheel device 3 is adjusted by the angle adjusting member 34 to select the chamfering angle and by the depth control member 35 to select the chamfering depth for the glass plate to be ground. The holding membrers 42 of the press conveyor device 2 are adjusted by the vertical sliding threaded device 17 while considering various factors such as the width, i.e., the height in the vertical direction, of the glass plate, and the chamfering angle and the chamfering depth for the glass plate 5 to be ground. In other words, it is set to such a position where the holding members 42 can most firmly hold the glass plate 5 and the grinding wheel 33 of the grinding wheel device 3 does not abut against the lower end 54 of the holding members 42. The glass plate 5 conveyed in a vertically oriented state by the endless feed belt 47 of the feed conveyor device 28 is seized between the holding members 42 and the endless belt 7 and subjected to grinding such as chamfering by the grinding wheel 33 while being seized and conveyed in the direction of the arrow 58.

The glass plate 5, having passed through the gap 37 while being sustained by the seizing force, is now placed on the endless discharge belt 48 of the discharge conveyor device 29, conveyed thereon in the vertically oriented state and then removed.

As described above, in this embodiment, the support conveyor device 1 can support the glass plate 5 by using the endless belt conveyor 7, and the press conveyor device 2 can seize the glass plate 5 in co-operation with the endless belt conveyor 7 while using a caterpillar conveyor comprising the endless chain 21 having a plurality of rectangular holding members 42 mounted thereon. Accordingly, even when the belt conveyor 7 of the support conveyor device 1 and a plurality of the holding members 42 of the press conveyor device 2 seize a glass plate 5 having a width sufficiently smaller than the longitudinal width of the rectangular holding members 42 only at the lower end of the contact face 60 of the holding members 42, the slant of the surface of the holding members 42 opposing the glass plte 5 can be decreased in accordance with the invention as compared with the case where the caterpillar conveyor system is employed for both the press conveyor device 2 and the support conveyor device 1. Therefore, the glass plate 5 can be held near the predetermined intended grinding position and can be ground in a precise manner. Further, since the seizing conveyance for the glass plate 5 is carried out by the driving force from the sprocket 20 while using the endless chain 21 of the press conveyor device 2 as a medium, reliable conveyance with no slippage can be attained. Furthermore, since the endless belt 7 of the support conveyor device 1 is of a broad width and quite unitary over the entire width and the tensile load is distributed over its entire width, in accordance with the invention if the endless belt 7 seizes a glass plate 5 of smaller width in a deviated manner, the endless belt 7 itself causes no deformation.

Needless to say, there is no difference in the deformation of the endless belt 7 between the seizing side for the conveyance, that is, the side on which a tension is applied and the open side, that is, the side at which the tension is released, whereby no tilting of the glass plate 5 is caused when it is being seized and the plate 5 can be seized for straight forwarding and conveyed linearly.

As described above, with the glass plate grinding apparatus according to this invention, since the glass plate to be seized is conveyed by driving means for rotating the sprocket means, the first conveyor means comprising the circulating chain engaging the sprocket means and holding members arranged in parallel to each other at the outer circumference of the chain, reliable movement with no slippage can be attained. Further, since the second conveyor means, comprising a belt conveyor disposd in opposition to the holding members, seizes the glass plate in co-operation with the holding means and circulates in the circulating direction to move the glass plate uniformly and disperses the tensile load caused by the seizing over the entire surface of the belt conveyor even when it seizes a glass plate having a width substantially smaller than that of the belt conveyor, there is no difference in the deformation of the belt conveyor between the seizing side for conveyance and the open side not seizing the plate, whereby no tilting occurs in the glass plate to be conveyed while being seized.

As described above, the glass plate grinding apparatus according to this invention can perform the intended glass plate grinding accurately by a constitution comprising, in combination, caterpillar conveyor for conveying without slippage and a belt conveyor capable of holding the glass plate firmly with no tilting.

What is claimed is:

1. An apparatus for beveling an edge of a glass plate during conveyance of the glass plate, comprising a base, a first frame mounted on said base, an endless belt capable of circulation, which is endless with respect to the direction of conveyance of the glassplate and mounted on said first frame so as to support the glass plate at one face of the glass plate, a second frame mounted on said base, pressing means capable of circulation and mounted on said second frame opposite to the endless belt so as to press the other face of the glass plate, said endless belt and said pressing means cooperating during circulation to seize and convey the glass plate arranged therebetween and grinding means mounted on said base opposite to said endless belt in the vicinity of the edge of the glass plate so as to bevel the edge of the other face of the glass plate by grinding, said pressing means comprising two sprockets mounted near both longitudinal ends of said base, rotatably supported shafts respectively connected to said sprockets, a driving device connected to one of the supported shafts for rotating one sprocket by driving said one shaft, two endless chains disposed between said sprockets, each endless chain being respectively coupled to both sprockets whereby the other sprocket is rotated upon rotation of said one sprocket, a plurality of pressing members each having a pressing base member with one surface coupled to the endless chains, slidable members respectively mounted with respective one surfaces thereof on upper and lower ends of the one surface of the pressing base member and with the respective other surfaces thereof respectively in slidable and plane contact with stainless steel plates which are secured to rod members secured to upper and lower ends of said second frame, each pressing member being supported in the direction of pressing by substantially only said respective sliding members, a roller rotatably mounted on a vertical center of the one surface of the pressing base member and disposed in a guiding groove between upper and lower rail members secured to a vertical central portion of said second frame, for guiding the movement of the pressing members in the direction of said circulating movement, a thin plate member having one surface thereof attached on the other surface of the pressing base member, and a resilient member having one surface thereof attached to the other surface of the thin plate member and having a plurality of projections at the other surface thereof against which the other surface of the glass plate is resiliently pressed by the pressing member, said pressing members being arranged parallel to each other, and said first frame being provided with displacing means for displacing a surface of said endless belt toward and away from the glass plate, said first frame being mounted on said base through said displacing means, and said apparatus further comprising guiding means disposed at an inner surface of said endless belt for guiding a movement of the belt and maintaining the vertical position of said endless belt during seizure of the glass plate.

* * * * *